United States Patent [19]

Okunishi et al.

[11] Patent Number: 4,728,228

[45] Date of Patent: Mar. 1, 1988

[54] MILLING CUTTER

[75] Inventors: Hiromu Okunishi, Iruma; Shigenari Shino, Kawagoe, both of Japan

[73] Assignee: Honda Giken Kogyo Kabushiki Kaisha, Tokyo, Japan

[21] Appl. No.: 780,289

[22] Filed: Sep. 26, 1985

[30] Foreign Application Priority Data

| Sep. 29, 1984 | [JP] | Japan | 59-204721 |
| Sep. 29, 1984 | [JP] | Japan | 59-204723 |
| Nov. 22, 1984 | [JP] | Japan | 59-177933[U] |
| Nov. 22, 1984 | [JP] | Japan | 59-177934[U] |

[51] Int. Cl.[4] .............................. B26D 1/12
[52] U.S. Cl. ............................ 407/35; 407/43; 407/55
[58] Field of Search ............... 407/35, 43, 46, 51, 407/52, 53, 55, 56, 21

[56] References Cited

U.S. PATENT DOCUMENTS

| 2,216,139 | 10/1940 | Slayton et al. | 407/21 |
| 2,974,399 | 3/1961 | King et al. | 407/21 |
| 3,242,553 | 3/1966 | Bogsten | 407/46 |
| 3,391,438 | 7/1968 | Milewski | 407/46 |
| 3,643,310 | 2/1972 | Kilbourne | 407/43 |
| 3,701,187 | 10/1972 | Erkfritz | |
| 3,816,893 | 6/1974 | Farrow | 407/46 |
| 4,097,174 | 6/1978 | Hewlein | 407/46 |
| 4,551,043 | 11/1985 | Kirchberger | 407/35 |
| 4,563,929 | 1/1986 | Ringlee et al. | 407/35 |

FOREIGN PATENT DOCUMENTS

| 24597 | 3/1981 | European Pat. Off. | 407/46 |
| 280586 | 11/1928 | United Kingdom . | |
| 344262 | 3/1931 | United Kingdom . | |
| 613495 | 11/1948 | United Kingdom . | |

Primary Examiner—Nicholas P. Godici
Attorney, Agent, or Firm—Banner, Birch, McKie & Beckett

[57] ABSTRACT

A milling cutter has a cutter body including one or more steps extending along the outer peripheral edge of the cutter body. Cartridges are detachably mounted on the step, each of the cartridges having a plurality of equally spaced cutting edges. Preferably, the cutter body has a radially outer step and a radially inner step close thereto, and the cartridges with roughly cutting edges are mounted on the radially outer step. Roughly cutting edges and finishing cutting edges may be attached to the outer and inner surfaces of a single cartridge. When the cartridges are mounted on the step, the cutting edges are equally spaced fully around the cutter body for successive milling operation on a workpiece.

14 Claims, 37 Drawing Figures

4,728,228

MILLING CUTTER

BACKGROUND OF THE INVENTION

The present invention relates to a milling cutter, and more particularly to a cartridge-type milling cutter composed of a disc-shaped cutter body and a plurality of cartridges each having a plurality of cutting edges on an outer peripheral surface thereof and attached successively to the outer peripheral surface of the cutter body, the cutting edges of the cartridges being spaced at substantially equal intervals.

Milling machines widely used in the art have a circular milling cutter fitted over a shaft for cutting a workpiece as it is fed at a predetermined speed. Conventional milling cutters can roughly be grouped into two types: In one type, the cutter body and the cutting edges are integral with each other, and according to the other type, the cutter body and the cutting edges are separate from each other. The milling cutter of the former class is disadvantageous in that when the cutting edges are worn by milling a large number of workpieces, the entire milling cutter must be replaced even if only the cutting edges are required to be replaced. For milling different types of workpieces, different milling cutters must be used. Therefore, as many milling cutters as the number of different workpiece types to be milled should be kept in stock.

As disclosed in U.S. Pat. No. 3,701,187, the milling cutter of the latter type has a plurality of tips detachably attached to the cutter body, and only those tips which have been worn can be replaced.

However, there is a limitation on the number of tips that can be fixed to a single cutter body, and quite a large space is required for attachment of the tips. Consequently, the number of tips which can be fastened to the cutter body is not so great. When the tips are to be changed to mill a particular workpiece to be milled, the bolts by which the tips are fastened to the cutter body must be loosened one by one to remove the tips. Such a procedure is so tedious and time-consuing that it is practically infeasible in factories and machine shops. For milling a workpieces to produce rough and and then finished surfaces, two milling cutters have to be used. After the workpiece has been milled by the rough milling cutter, the rough milling cutter should be replaced with the finishing milling cutter. The replacement process is highly complex and time-consuming, resulting in a low rate of production. Generally, the number of finishing tips or flat drags is one or two, and hence the milling efficiency is poor.

SUMMARY OF THE INVENTION

It is an object of the present invention to provide a milling cutter composed of a pluraltiy of cartridges each having a plurality of cutting edges and detachably mounted on a cutter body, the milling cutter being capable of continuous milling operation and of easily changing worn or damaged cutting edges or replacing the cutting edges to meet different workpiece types.

Another object of the present invention is to provide a milling cutter which is fitted with cartridges having rough cutting edges and cartdriges having finishing cutting edges, so that a workpiece can be milled by the single milling cutter with the rough and finishing cutting edges, and which can replace worn or damaged cutting edges with new ones or change the cutting edges to meet a different workpiece type simply by replacing the cartridges.

Still another object of the present invention is to provide a milling cutter comprising a cutter body having a step extending along an outer peripheral edge thereof, and a plurality of cartridges disposed successively on the step without substantial gaps therebetween, each of the cartridges having at least two cutting edges, the cutting edges of the cartridges being spaced at equal intervals fully around the cutter body.

A still further object of the present invention is to provide a milling cutter including a plurality of roughly cutting edge portions and a plurality of finishing cutting edge portions which are concentrically mounted on a cutter body by cartridges, the roughly cutting edge portions being detachably mounted on the cartridges by fasteners, and the finishing cutting edge portions being brazed to the cartridges.

A yet still further object of the present invention is to provide a milling cutter including a cutter body, a plurality of first cartridges each having a first group of roughly cutting edges, and a plurality of second cartridges each having a second group of finishing cutting edges, the first and second cartridges being concentrically mounted on the cutter body at different heights, each of the finishing cutting edges including abrasive grain.

Still another object of the present invention is to provide a milling cutter comprising a disc-shaped cutter body having two annular recesses extending along an outer peripheral edge thereof and having bottoms lying at different heights, and two groups of cartridges detachably mounted successively in the annular recesses and each having at least two cutting edges.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13b is a plan view of the cartridge of FIG. 13a;

DESCRIPTION OF THE PREFERRED EMBODIMENTS

Figure 1:
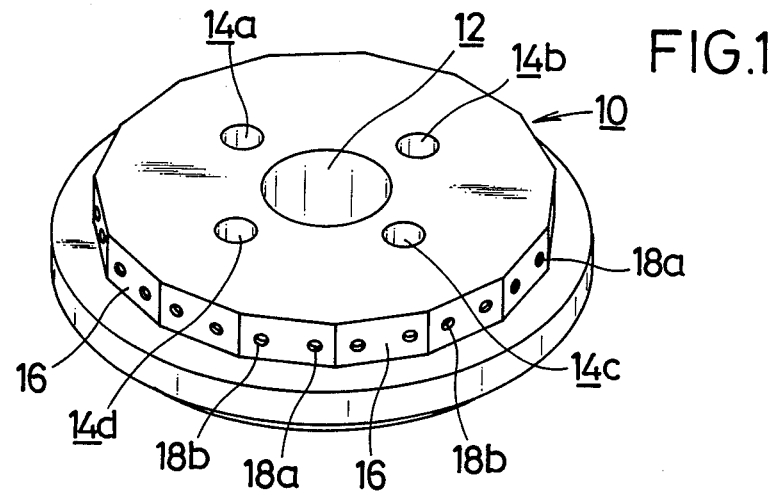
FIG. 1 is a perspective view of the cutter body of a milling cutter according to the present invention.

Like or correspoding parts are denoted by like or corresponding reference characters throughout the views.

Figure 2:
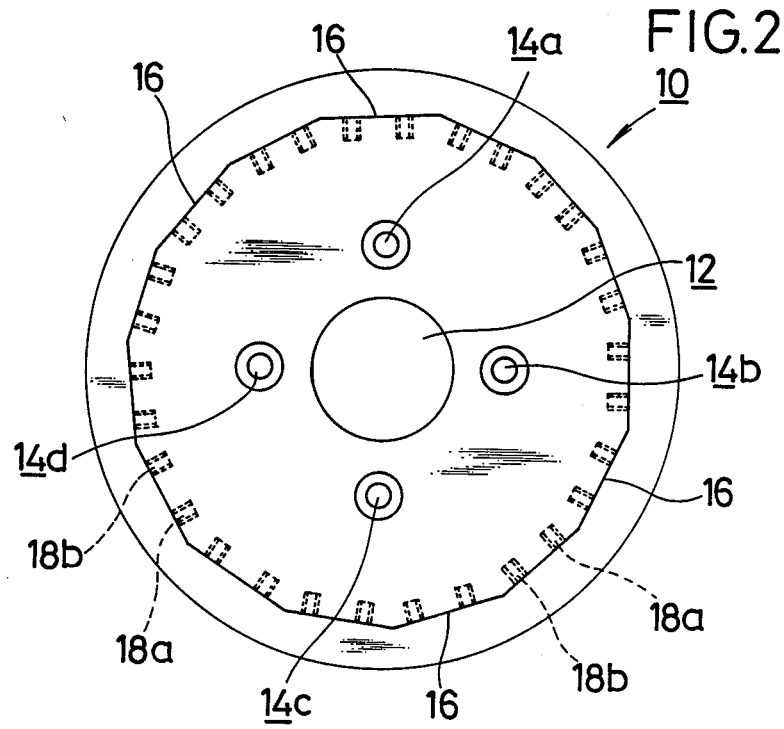
FIG. 2 is a plan view of the cutter body shown in FIG. 1.
Figure 3:
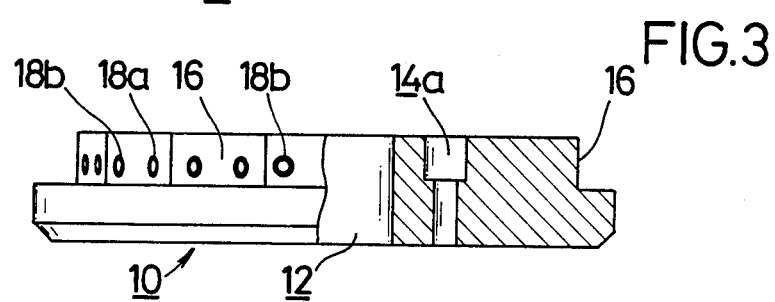
FIG. 3 is a front elevational view, partly in cross section, of the cutter body of FIG. 1.

As shown in FIGS. 1 through 3, a cutter body 10 has a central large-diameter hole 12 in which the end of the rotatable shaft of a milling machine will be fitted as described later on.

The cutter body 10, which is of a ring shape, also has a plurality (four in the illustrated embodiment) of bolt holes 14a through 14d spaced at angular intervals around the central hole 12. The cutter body 10 also has a plurality of steps 16 successively defined on the outer peripheral surface of the cutter body 10, each of the steps 16 being of a prescribed length. Each step 16 has a side wall in which a pair of bolt holes 18a, 18b is defined and extends radially inwardly of the cutter body 10.

Figure 4:
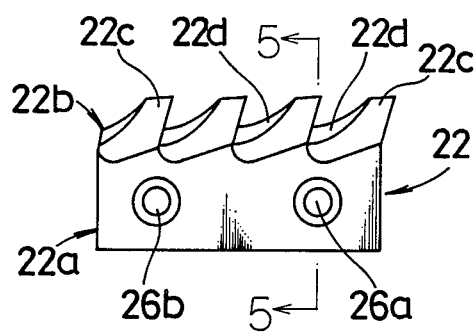
FIG. 4 is a front elevational view of a cartridge that can be attached to the cutter body.
Figure 5:
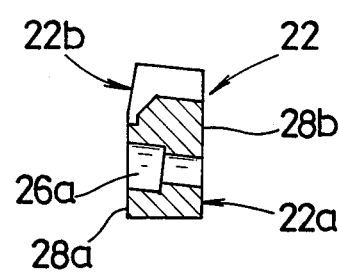
FIG. 5 is a cross-sectional view taken along line 5—5 of FIG. 4.

Cartridges 22 (FIGS. 4 through 6) are held respectively against the steps 16 successively without interruptions or gaps. The cartridge 22 is composed of a body 22a and a cutting edge portion 22b which has a plurality of cutting edges 22c and a plurality of quadrantal flutes 22d extending from the cutting edges 22c, respectively. The body 22 also has a pair of holes 26a, 26b inclined slightly with respect to the radial direction of the cutter body 10.

Figure 6:
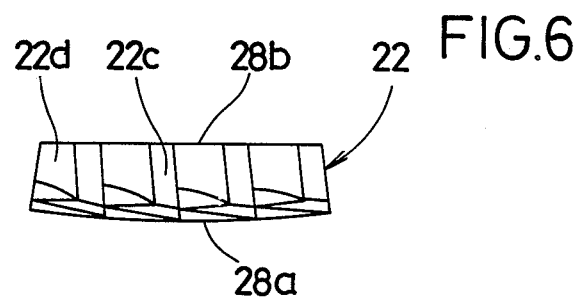
FIG. 6 is a plan view of the cartridge.

As shown in FIG. 6, the cartridge 22 has an arcuate outer surface 28a and a flat inner surface 28b.

Figure 7:
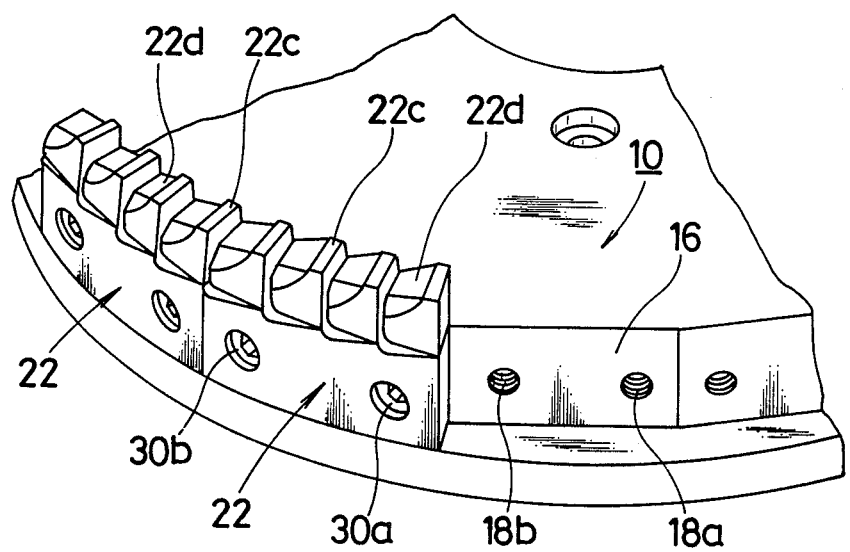
FIG. 7 is a fragmentary perspective view of the cutter body with cartridges attached thereto.
Figure 8:
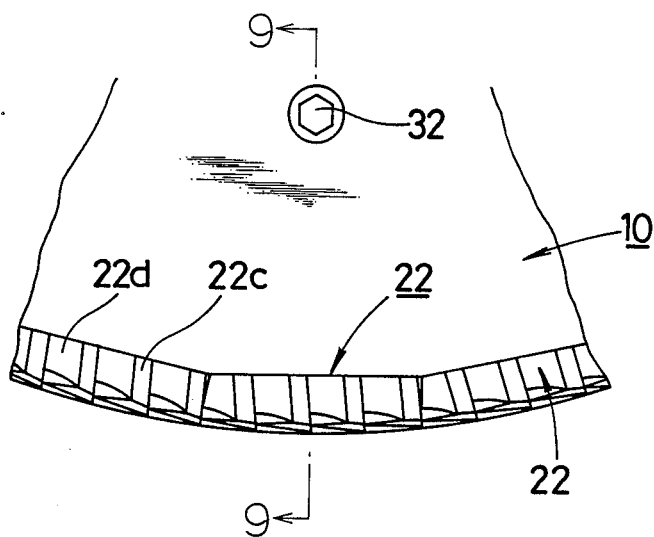
FIG. 8 is a fragmentary plan view of the cutter body with cartridge attached thereto.
Figure 10:
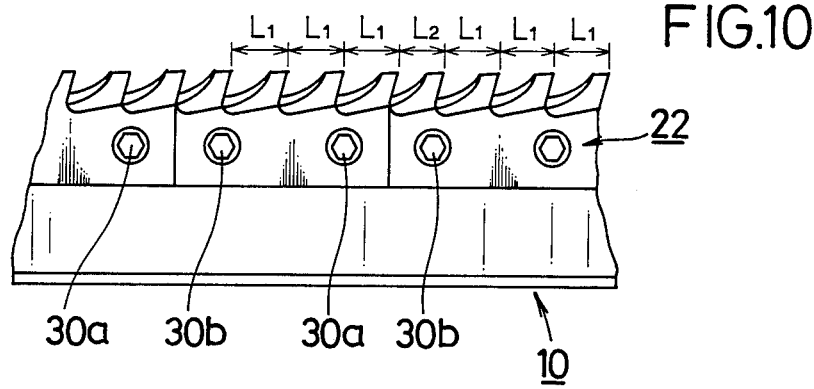
FIG. 10 is a fragmentary front elevational view of the cutter body with cartridges illustrated in FIG. 8.

As illustrated in FIGS. 7 and 8, each cartridge 22 is mounted on the cutter body 10 by bolts 30a, 30b extending through the holes 26a, 26b in the cartridge 22 and threaded into the bolt holes 18a, 18b in the cutter body 10. Since the steps 16 of the cutter body 10 are shaped complementarily to the flat surfaces 22b of the cartridges 22, respectively, the cartridges 22 can be positioned easily with respect to the cutter body 10. Inasmuch as the cartridge 22 is somewhat sectorial in shape when seen in plan as shown in FIG. 6, the cartridges 22 can be arranged around the cutter body 10 successively without interruptions or gaps. With the cutting edges 22c equally spaced around the cutter body 10, a workpiece which is milled by the cutting edges 22c can be successively cut, and hence the resistance to the cutting movement of the cutting edges 22c is rendered uniform, thus avoiding variations in the load imposed on the milling cutter during milling operation. As illustrated in FIG. 10, the distances L1 between the adjacent cutting edges 22c are made equal to each other, and the edge-to-edge distance L2 between the adjacent cartridges 22 are also made equal to the distance L1.

Figure 9:
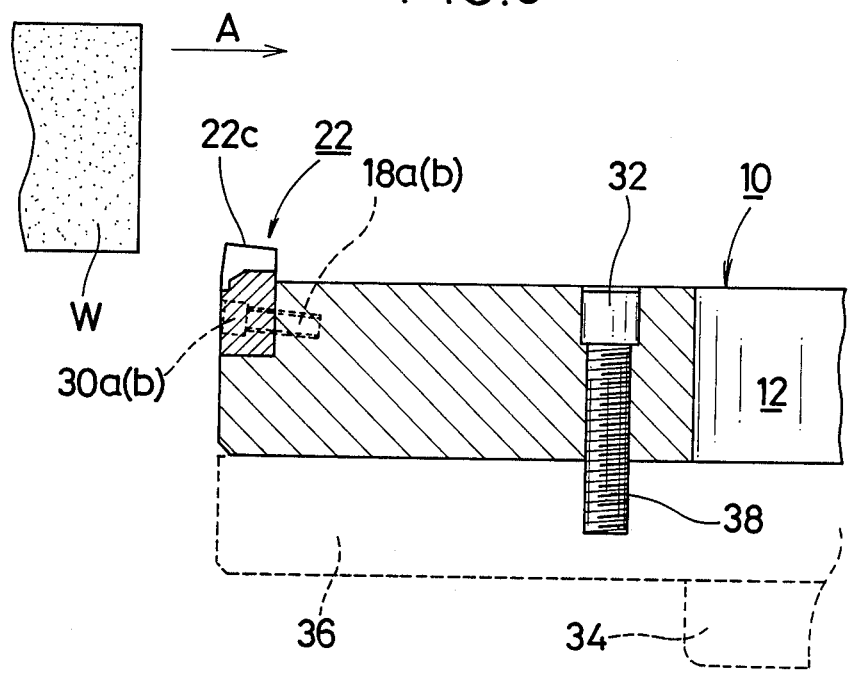
FIG. 9 is a cross-sectional view taken along line 9—9 of FIG. 8.

The cutter body 10 thus constructed is fixed by bolts 32 to a spindle 34 as shown in FIG. 9. More specifically, the bolts 32 are inserted through the respective holes 14a through 14d in the cutter body 10, and threaded into bolt holes 38 defined in a flange 36 integral with the spindle 34. As a result, the cutter body 10 and the spindle 34 are firmly fastened together. A spacer may be disposed between the flange 36 and the cutter body 20 to adjust the height of the cutting edge portions 22b of the cartridges 22.

Operation and advantages of the milling cutter of the foregoing construction will be described below.

When the spindle 34 is rotated at a high speed by a rotative drive source (not shown), the flange 36 is also rotated and so is the cutter body 10 fixed to the flange 36 by the bolts 32. As a workpiece W is moved in the direction of the arrow A as shown in FIG. 9, the cutting edges 22c of the cartridges 22 mounted on the cutter body 10 start cutting the workpiece W. Since the many cutting edges 22c are mounted at equal distances on the cutter body 10, the workpiece W can be successively and quickly be cut to a nicety. Chips formed by cutting the workpiece W are discharged through the flutes 22d between the cutting edges 22c.

The cutting edges 22c which may be worn or damaged or which are to be replaced to meet a different workpiece type can easily be changed simply by replacing their cartridges 22. More specifically, the bolts 30a, 30b are loosened to replace the detached cartridges 22 with new or desired cartridges, which can be mounted on the cutter body 10 by tightening the bolts 32. Therefore, the cutting edges can be replaced with other cutting edges with utmost ease.

The milling cutter of multiple cutting edges according to the above embodiment is of a simple construction. Because the number of cutting edges mounted on the cutter body is large, the workpiece can be milled smoothly by the cutting edges as if it were ground by a grinding wheel. The workpiece can be cut successively to a nicety, rather than intermittently, by the cutting edges since they are equally spaced even between the cartridges. The cut surface of the workpiece is therefore even and smooth. The cutting edges, worn or damaged or to be changed to mill a different workpiece, can easily be changed simply by replacing the cartridges. The cutting edges can easily be positioned with respect to the cutter body simply by fastening the cartridges to the cutter body.

Figure 11:
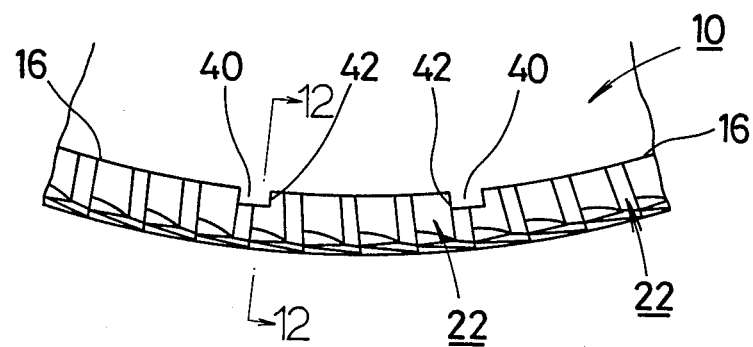
FIG. 11 is a fragmentary plan view of a cutter body according to another embodiment with cartridges mounted thereon.
Figure 12:
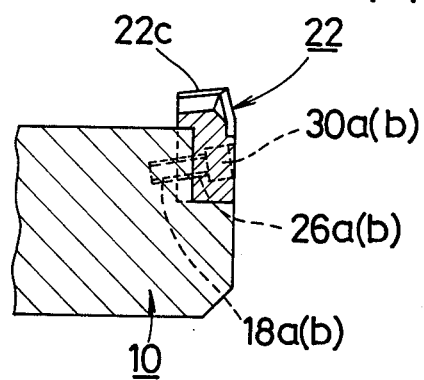
FIG. 12 is a cross-sectional view taken along line 12—12 of FIG. 11.

FIGS. 11 and 12 illustrate a milling cutter according to another embodiment of the present invention. Steps 16 defined around the outer peripheral surface of a cutter body 10 has a plurality of ridges 40 spaced at equal intervals. Each cartridge 22 has slots 42 defined in its longitudinal ends in complementary relation to the ridges 40. When the cutter body 10 and the cartridges 22 are assembled together, the ridges 40 are fitted in the combined slots 42 in the cartridges 22. Therefore, the cartridges 22 can easily be positioned by the ridges 40 with respect to the cutter body 10. The cutting edges 22c are equally spaced on and between the cartridges 22. The cartridges 22 are detachably fastened to the cutter body 10 by bolts. Thus, the cutting edges 22c can easily be replaced with new or other cutting edges simply by replacing the cartridges 22.

Since the many cutting edges 22c are disposed at equal spacings, they can successively cut a workpiece. The cutting edges 22c, even if worn or damaged, or to be changed to meet a different workpiece, can easily be changed by replacement of the cartridges 22. The cartridges 22 can easily and reliably be positioned with respect to the cutter body 10 by interfitting engagement between the ridges 40 and the slots 42.

In the aforesaid two embodiments, the cartridge body and the cutting edges are integral with each other to make the cartridge rigid to provide for continuous milling operation. However, the cartridge body and the cutting edges may not be integral with each other for effecting continuous milling operation. Various embodiments in which the cartridge body and cutting edges are separate from each other will be described below.

Figure 13A:
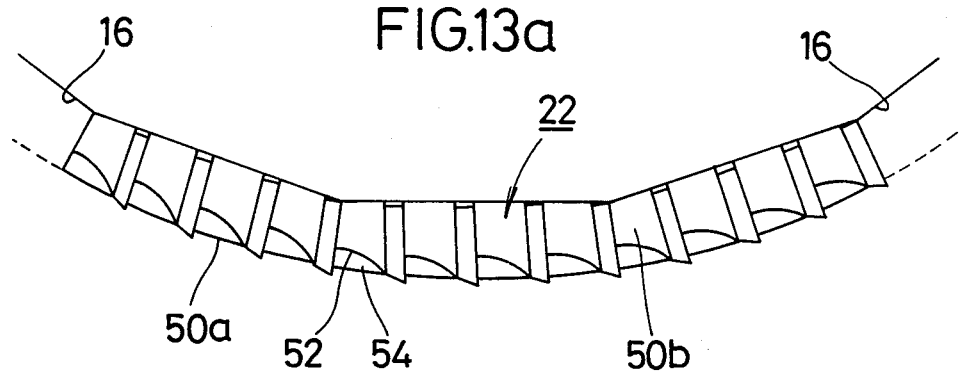
FIG. 13a is a fragmentary plan view of a cutter body with cartridges attached according to still another embodiment.
Figure 13B:
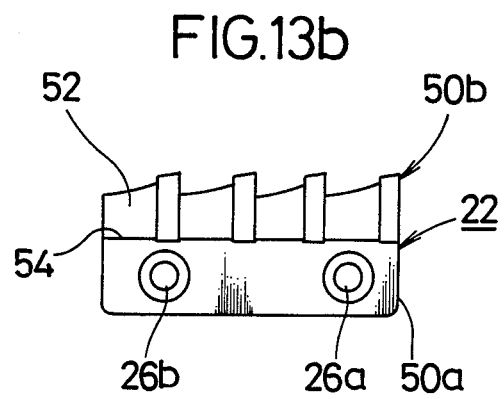

As shown in FIGS. 13a and 13b, cartridges 22 mounted on the cutter body 10 are fastened respectively to the polygonal steps 16 of the cutter body 10. The cartridge 22 comprises a body 50a and a cutting edge portion 50b composed of a plurality of cutting edges brazed to the body 50a. The cutting edge portion 50b has chip pockets 52 defined as curved recesses or flutes to expose cutting surfaces 54 of the body 50a. Since the chip pockets 52 are defined by curved surfaces, chips can smoothly be discharged from the milling cutter.

Figure 13C:
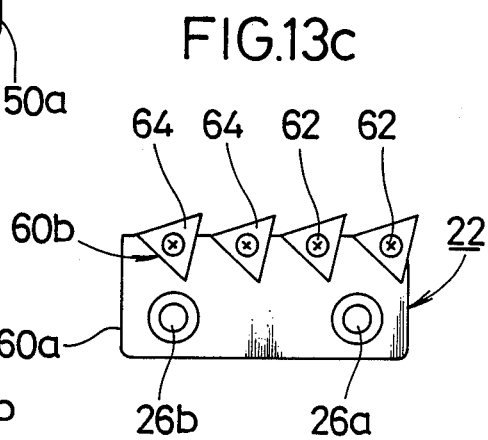
FIGS. 13c and 13d are plan views of different cartridges according to other embodiments.

FIG. 13c shows a cartridge 22 having a larger body 60a and a cutting edge portion 60b composed of a plurality of cutting edges 64 fastened to the body 60a by means of respective screws 62. Any cutting edge 64 which is worn or damaged can be replaced with a new one by loosening and tightening the corresponding screw 62 without replacing the cartridge itself. Therefore, the cartridge of FIG. 13c is more economical than the integral cartridges.

Figure 13D:
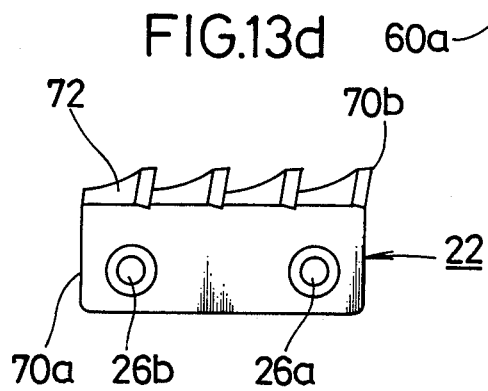

According to an embodiment shown in FIG. 13d, a cartridge 22 has a large body 70a and a cutting edge portion 70b brazed to the body 70a, the cutting edge portion 70b being relatively small with respect to the body 70a. Therefore, the chip pockets 72 defined in the cutting edge portion 70b are also relatively small. As a result, the cutting edge portion 70b can be manufactured less costly and is rendered rigid.

Figure 14:
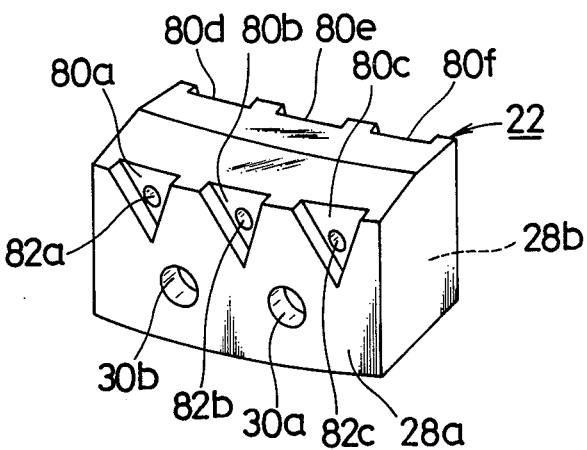
FIG. 14 is a perspective view of a cartridge according to another embodiment.
Figure 15:
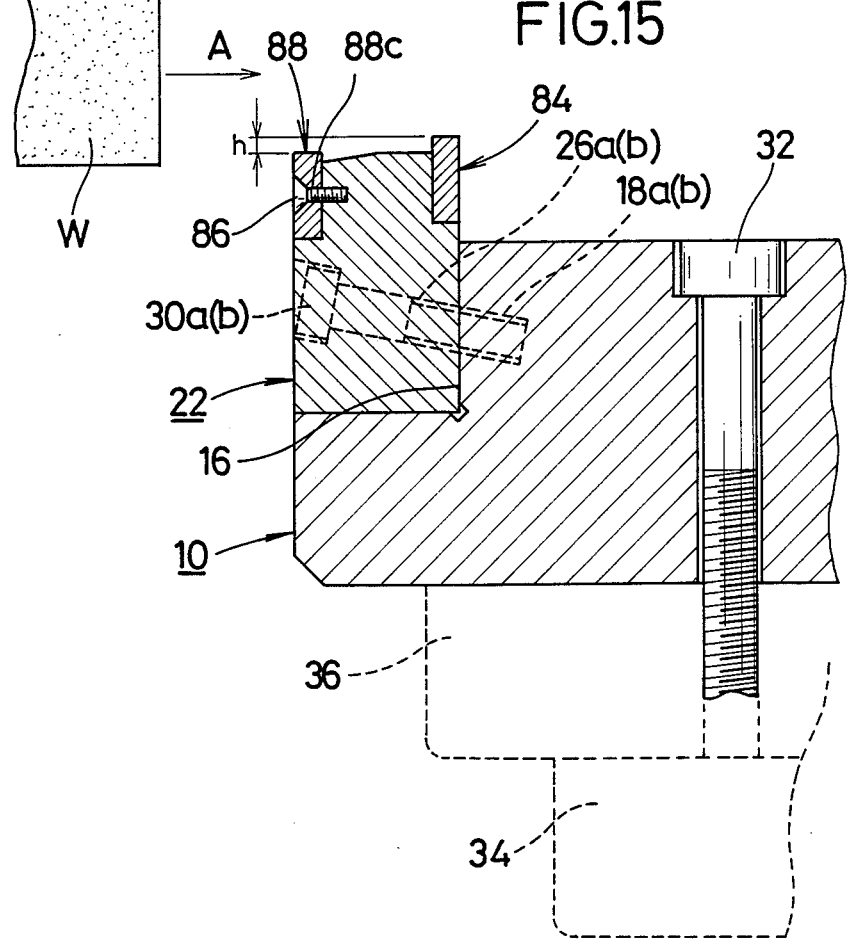
FIG. 15 is a fragmentary cross-sectional view of a cutter body and a cartridge mounted thereon according to the embodiment of FIG. 14.
Figure 16:
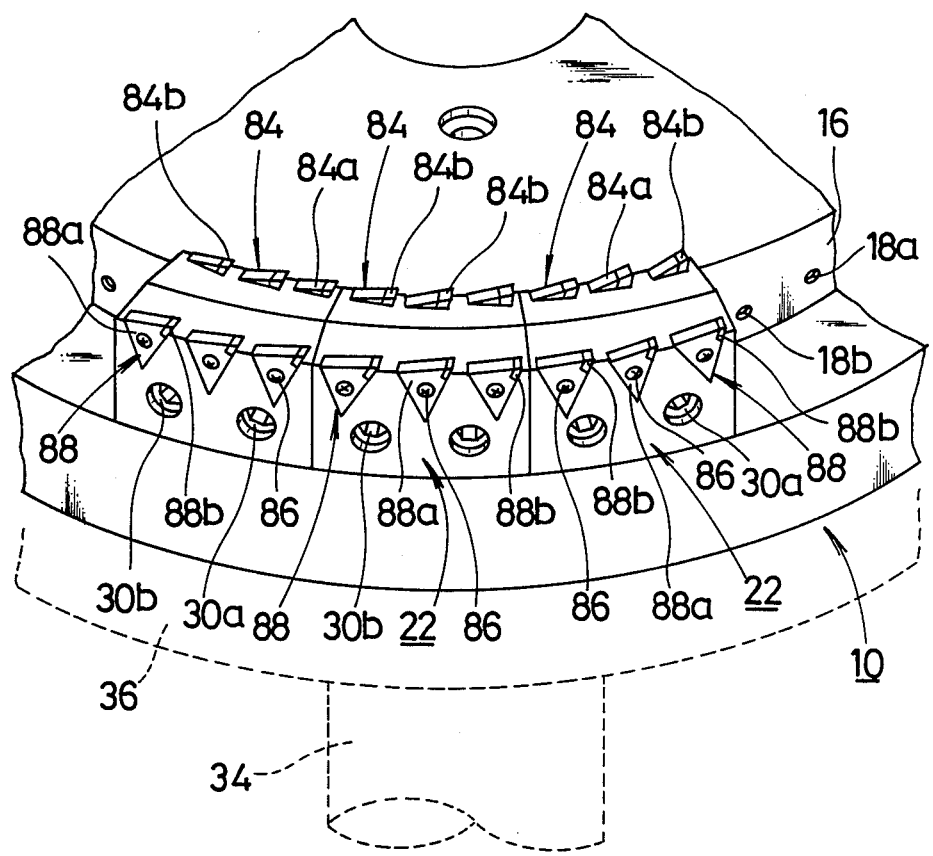
FIG. 16 is a fragmentary perspective view of the cutter body with cartridges mounted thereon according to the embodiment of FIG. 14.

FIGS. 14 through 16 are illustrative of a milling cutter according to still another embodiment of the present invention. In this embodiment, a single cartridge is fitted with rough cutting tips and finishing cutting tips, and by mounting such cartridges on a cutter body, a workpiece can be milled by a single milling cutter with the rough cutting tips and finishing cutting tips.

A cartridge 22 has triangular recesses 80a through 80c and 80d through 80f defined in upper sides thereof in lateral alignment, and threaded holes 82a through 82c defined centrally in the recesses 80a through 80c, respectively. As illustrated in FIGS. 15 through 16, a first tip 84 is secured in each of the recesses 80d through 80f. The first tip 84 comprises a body 84a and a cutting edge 84b made of cubic boron nitride (CBN). The tips 84 are secured by the cartridge 22 by brazing. Therefore, the distances between the tips 84 as fixed to the cartridge 22 can be as small as possible, and many tips 84 can be attached to the cutter body 10.

Second tips 88 are secured in the respective recesses 80a through 80c. Each of the second tips 88 is composed of a body 88a and a cutting edge 88b made of or including diamond, the body 88a having a central hole 88c. The second tips 88 can be fastened to the cartridge 22 by bolts 86 extending through the holes 88c threadedly into the threaded holes 82a through 82c.

The first tip 84 has its cutting edge higher than that of the second tip 88 by a distance h (FIG. 15) so that the first tip 84 will be closer to the workpiece W. As shown in FIG. 16, the first and second tips 84, 88 are inclined such that the cutting edges 84b of the first tips 84 and the cutting edges 88b of the second tips 88 are higher than the rest of the first and second tips 84, 88 to provide a clearance angle and a rake angle between the tips 84, 88 and the workpiece W. Therefore, the cutting edges 84b, 88b are prevented from frictional contact with the workpiece W, and chips can smoothly be discharged out.

The cartridges 22 of FIG. 14 are arranged around the cutter body 10 successively without gaps therebetween. The flat surfaces of the cartridges 22 are held against the steps 16, and the cartridges 22 are fastened to the cutter body 10 by the bolts 30a, 30b threaded through the holes 26a, 26b into the bolt holes 18a, 18b. The cutter body 10 is secured to the spindle 34 by the bolts 32 threaded through the bolt holes 14a through 14d in the cutter body 10 into the holes 38 in the flange 36 on the spindle 34.

Operation and advantages of the milling cutter shown in FIGS. 14 through 16 are as follows:

When the spindle 34 is rotated at a high speed by a rotative drive source (not shown), the flange 36 and hence the cutter body 10 are rotated. As the workpiece W is moved toward the cutter body 10 in the direction of the arrow A as shown in FIG. 15, the cutting edges 88b of the second tips 88 start roughly cutting the workpiece W. Continued movement of the workpiece W toward the center of the cutter body 10 causes the cutting edges 84b of the first tips 84 to finish the milled surface of the workpiece W.

Since the many first tips 84 are brazed to the cartridges 22, the workpiece W can successively and quickly be cut to a nicety. The cutting edges 84b which are worn can be ground while they are attached to the cutter body 10. Therefore, the cutting edges 84b are maintained sharp for milling the workpiece W accurately as if it it were ground. The workpiece W can thus be milled to produce a highly smooth finished surface.

Under normal conditions, the workpiece W is milled in the manner described above. When a rough cutting edge 88b is broken or worn, the broken or worn second tip 88 is removed by loosening the bolt 86, and a new second tip 88 is fastened to the cartridge 22 by tightening the bolt 86. Where many second tips 88 are broken or worn, or the second tips 88 are to be replaced to meet the material of the workpiece W, the bolts 30a, 30b are loosened to remove the cartridges 22, and cartridges 22 with new or desired cutting edges are fastened to the cutter body 10 by the bolts 30a, 30b.

Since the first tips 84 serve to finish the workpiece W, they are less liable to be worn than the second tips 88, and hence the cutting edges 84b are more durable than the cutting edges 88b. When the cutting edges 84b are worn by finishing many workpieces W, the cutting edges 84b as they remain mounted on the cutter body 10 may be ground to keep them sharp and accurate as finishing cutting edges. According to this embodiment, as described above, the rough cutting edges which are subject to rapid wear are replaceably attached to the cartridges, and the finishing cutting edges which are less subject to wear are brazed to the cartridges. Consequently, an increased number of finishing cutting edges can be mounted on the cutter body. As all of the finishing cutting edges can be ground at the same time, they can be kept at a constant degree of sharpness for finishing at all times. As a result, the workpiece W can be milled to a nicety by the milling cutter.

Figure 17:
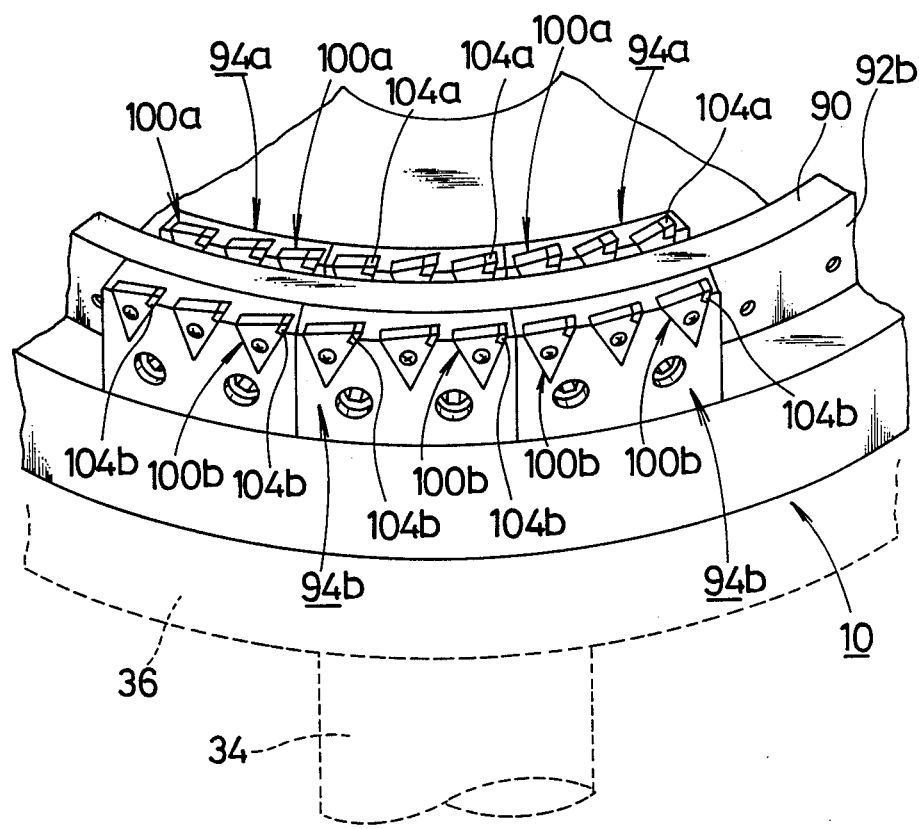
FIG. 17 is a fragmentary perspective view of a cutter body with cartridges mounted thereon according to still another embodiment of the present invention.
Figure 18:
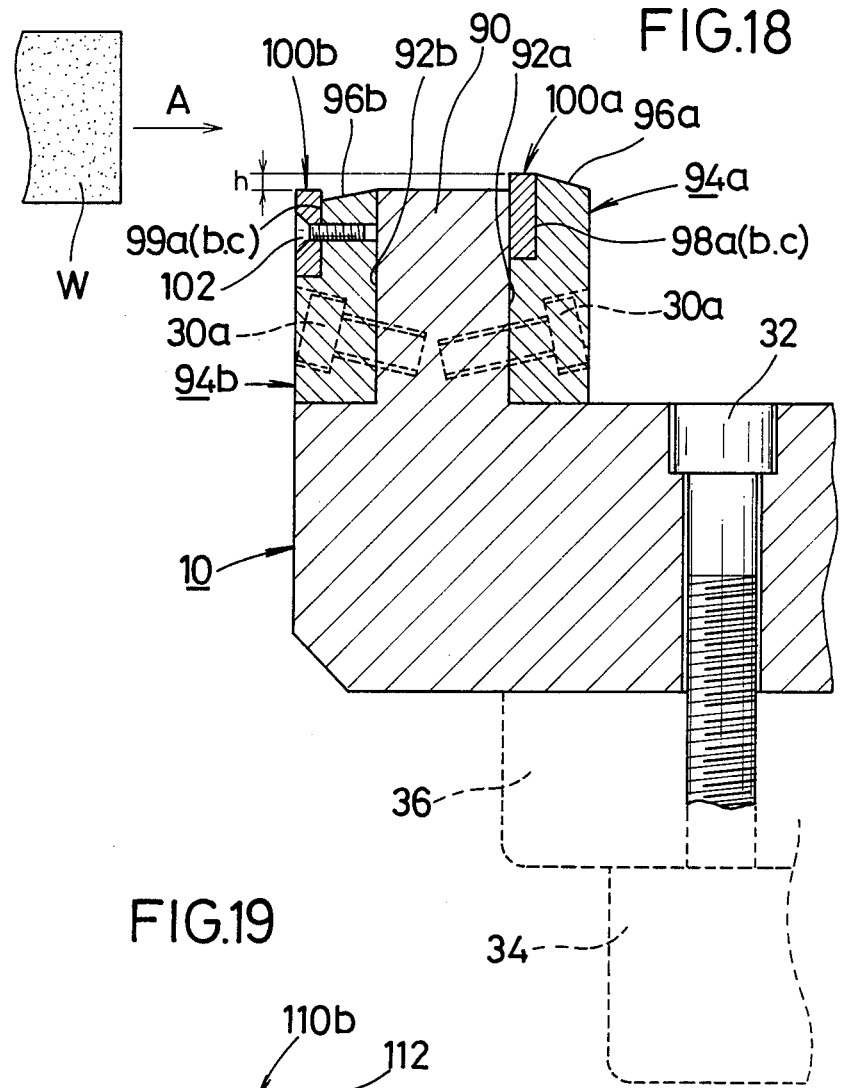
FIG. 18 is a fragmentary cross-sectional view of the cartridges mounted on the cutter body of FIG. 17.

FIGS. 17 and 18 show a milling cutter according to a still further embodiment of the present invention.

A cutter body 10 has an annular projection 90 extending along the outer peripheral edge of the cutter body 10. The annular projection 90 has a radially inner step 92a and a radially outer step 92b. First cartridges 94a are attached successively to the inner step 92a with no spacing between the first cartridges 94a, and second cartridges 94b are attached successively to the outer step 92b with no spacing between the second cartridges 94b. Each of the first cartridges 94a has a slanted upper surface 96a and a plurality of triangular recesses 98a through 98c defined in a side surface thereof confronting the step 92a and contiguous to the slanted upper surface 96a. First tips 100a are brazed in the respective recesses 98a through 98c. Each of the second cartridges 94b also has a slanted upper surface 96b and a plurality of triangular recesses 99a through 99c defined in a side surface thereof remote from the step 92b and opening in the slanted upper surface 96b. Second tips 100b are mounted respectively in the recesses 99a through 99c by bolts 102. The first tips 100a are higher than the second tips 100b by a distance h (FIG. 18) so as to be closer to the workpiece W. Each of the first tips 100a includes a cutting edge 104a disposed in its upper corner and made of cubic boron nitride (CBN). Each of the second tips 100b includes a cutting edge 104b disposed in its upper corner and made of or including diamond. The cutter body 10 is firmly coupled to the spindle 34 by the bolts 32 threaded into the flange 36.

The milling cutter of FIGS. 17 and 18 will operate and is advantageous as follows:

When the spindle 34 is rotated at a high speed by a rotative drive source (not shown), the flange 36 and hence the cutter body 10 are rotated. The workpiece W is moved toward the cutter body 10 in the direction of the arrow A as shown in FIG. 18, whereupon the cutting edges 104b of the second tips 100b on the second cartridges 94b start roughly cutting the workpiece W. Upon continued movement of the workpiece W toward the center of the cutter body 10, the cutting edges 104a of the first tips 100a finish the milled surface of the workpiece W. Therefore, the workpiece W can smoothly be finished at its milled surface.

According to the embodiment of FIGS. 17 and 18, the milling cutter can mill the workpiece W simultaneously in rough and finishing cutting modes, and can neatly finish the milled surface of the workpiece W. Since the rough and finishing cutting tips are secured to the respective cartridges, they can be replaced with desired tips simply by changing the cartridges.

Figure 19:
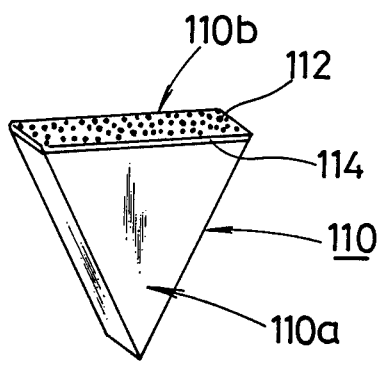
FIG. 19 is a perspective view of a tip according to a still further embodiment.
Figure 20:
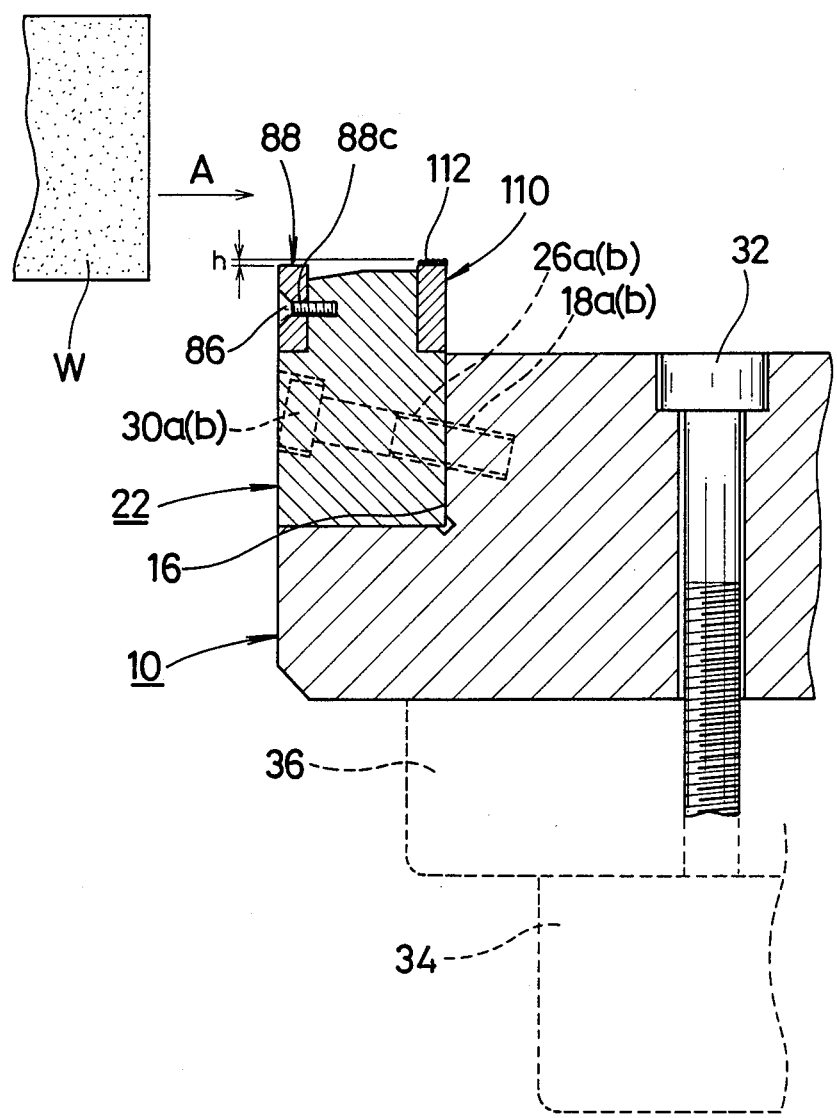
FIG. 20 is a fragmentary cross-sectional view of a cartridge supporting the tip of FIG. 19 and mounted on the cutter body.
Figure 21:
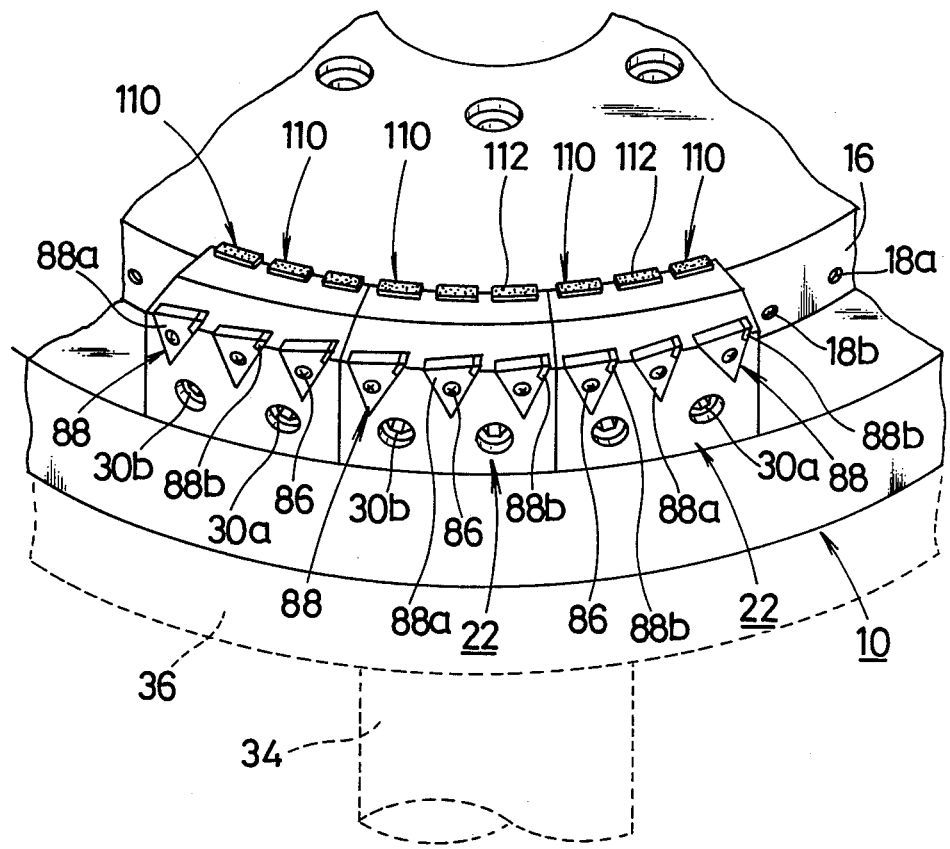
FIG. 21 is a fragmentary perspective view of the cutter body on which cartridges with the tips of FIG. 19 attached are mounted.

A milling cutter according to another embodiment is shown in FIGS. 19 through 21. This milling cutter has tips for roughly cutting a workpiece and tips coated with abrasive grain for finishing the workpiece.

First tips 110 are fitted respectively in the recesses 80d through 80f in the cartridge 22 shown in FIG. 14. As shown in FIG. 19, each of the first tips 110 is composed of a body 110a and a grinding portion 110b. The grinding portion 110b has abrasive grain 112 of diamond or cubic boron nitride (CBN) which is next to the diamond in hardness. The abrasive grain 112 is partly covered with a layer 114 of nickel which is electroplated and has a thickness that is about ⅔ of the thickness of the abrasive grain 114. Thus, the abrasive grain 114 is firmly anchored on the grinding portion 110b. For allowing the nickel layer 114 to be electroplated, the first tip 110 is made of an electrically conductive material which is considerably rigid, such as steel. The first tips 110 are preferably fixed to the cartridges 22 by brazing.

With the above arrangement, the spacing between adjacent first tips can be as small as possible, and hence many first tips 110 can be mounted on the cutter body 10. The other structure of the milling cutter is the same as that of the milling cutter shown in FIGS. 14 through 16, and will not be described.

In operation, the workpiece W is fed toward the cutter bocy 10, and the cutting edges 88b of the second tips 22 mounted on the cartridges 22 start to roughly cutting the workpiece W. As the workpiece W is continuously moved toward the center of the cutter body 10, the grinding portions 110b of the first tips 110 finish the workpiece W. As described above, the abrasive grain 112 made of diamond or cubic boron nitride is partly embedded in the plated layer 114. The first tips 110 are disposed on the cutter body 10 at close spacings. For these reasons, the workpiece W can be finished as if it were ground. Even where the workpiece W is composed of different materials of varying hardnesses, the milled surface of the workpiece W can smoothly be finished without producing steps or irregular surfaces which would arise from the different materials.

With the above embodiment, the workpiece can be finished as if it were ground even when it is made of materials of different hardnesses, and therefore the milled surface can be finished highly accurately. When any cutting edges are worn or damaged, or the cutting edges are to be changed to meet a different workpiece type, only the cutting edges may be replaced or the cartridges may be replaced with utmost ease.

Figure 22:
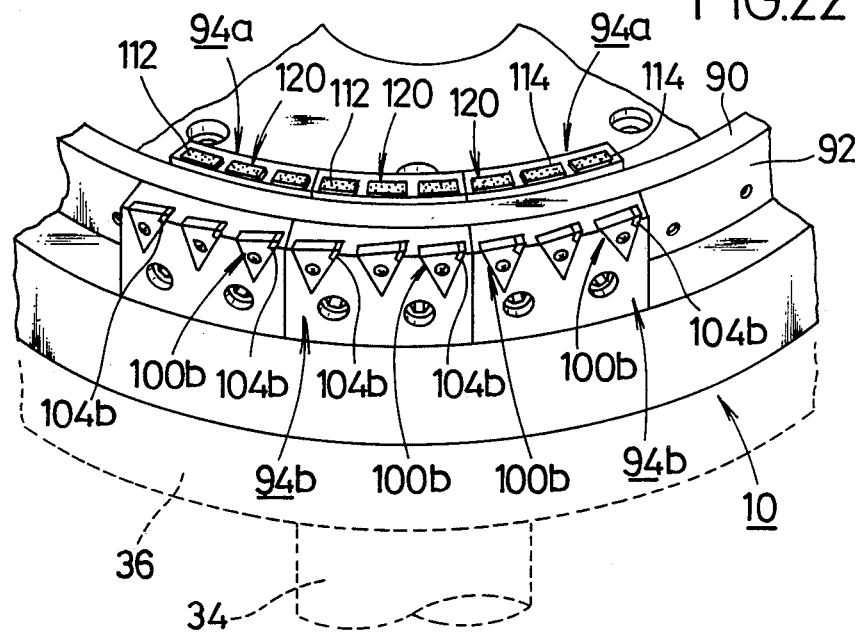
FIG. 22 is a fragmentary perspective view of a cutter body and cartridges assembled together according to another embodiment.
Figure 23:
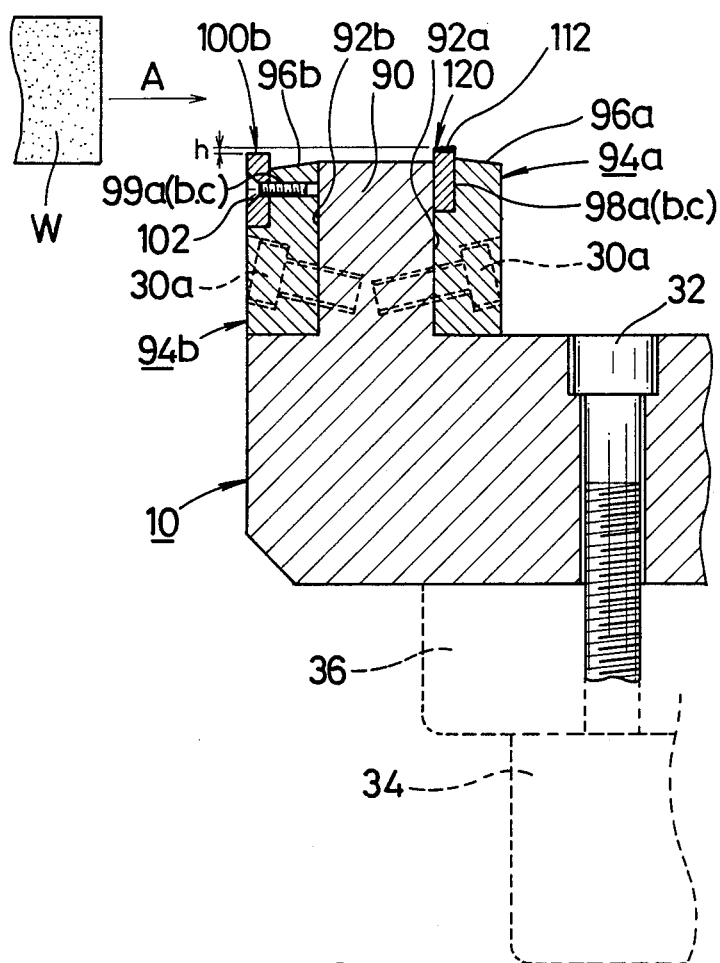
FIG. 23 is a fragmentary cross-sectional view of the cutter body and cartridges mounted thereon according to the embodiment of FIG. 22.

FIGS. 22 and 23 illustrate still another embodiment which is related to the embodiment of FIGS. 19 through 21. The embodiment of FIGS. 22 and 23 is similar to the embodiment of FIGS. 19 through 21, except that the tips 100a are replaced with tips 120. More specifically, each of the tips 120 is of a triangular shape and has abrasive grain 112 of diamond or cubic boron nitride fixed to the upper surface thereof by the plated layer 114 of nickel. Each of the second tips 100b has on its upper end a cutting edge 104b made of or including diamond. The first and second tips 120, 100b are fastened to the cartridges 22, and the cartridges 22 are mounted on the cutter body 10. The cutter body 10 is fastened to the flange 36 by the bolts 32, so that the cutter body 10 and the spindle 34 are firmly coupled together.

The milling cutter of FIGS. 22 and 23 will operate and has advantages in the same manner as the milling cutter of FIGS. 19 through 21.

More specifically, when the non-illustrated rotative drive source is energized, the spindle 34 coupled thereto and the cutter body 10 are rotated. By feeding the workpiece W toward the cutter body 10 in the direction of the arrow A, the cutting edges 104b of the second tips 100b start roughly cutting the workpiece W. Upon continued movement of the workpiece W toward the center of the cutter body 10, the abrasive grain 112 on the first tips 120 grinds the workpiece W. The milled surface of the workpiece W can therefore be finished highly accurately even if the workpiece W contains materials of different hardnesses.

With the aforesaid embodiment, the workpiece can simultaneously be roughly milled and finished by the single milling cutter, and the milled surface of the workpiece can neatly and smoothly be finished. Since the roughly cutting tips and the finishing cutting tips are secured to the cartridges, the tips can be replaced to meet a different kind of workpiece simply by replacing the cartridges.

FIGS. 24 through 34 show a milling cutter according to a still further embodiment of the present invention. According to this embodiment, a cutter body has two concentric steps disposed on peripheral edge portions thereof, and cartridges having roughly cutting edges are detachably mounted on the radially outer step while cartridges having finishing cutting edges are detachably mounted on the radially inner step. Therefore, a workpiece can simultaneously be roughly milled and finished by this milling cutter.

Figure 24:
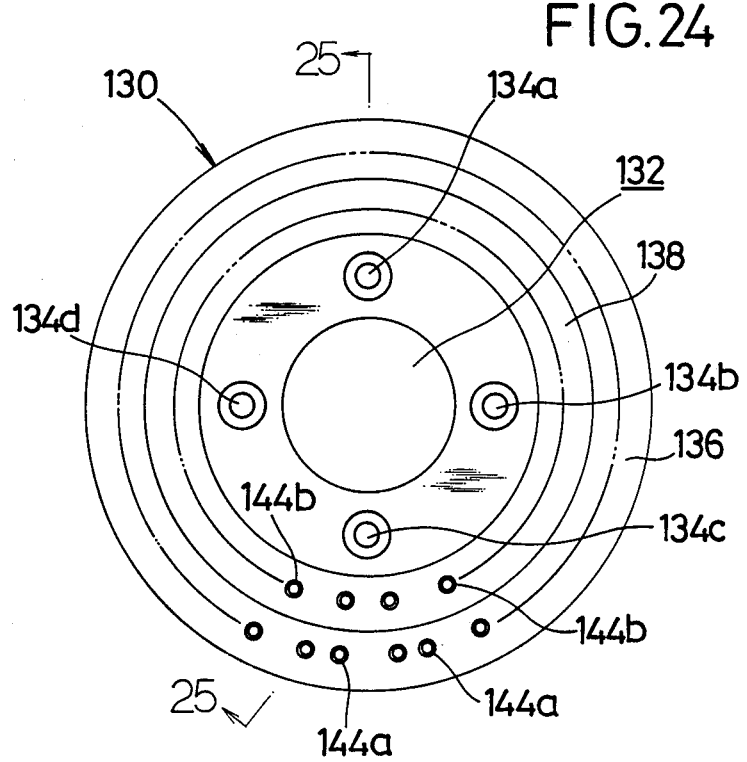
FIG. 24 is a plan view of a cutter body according to still another embodiment of the present invention.
Figure 25:
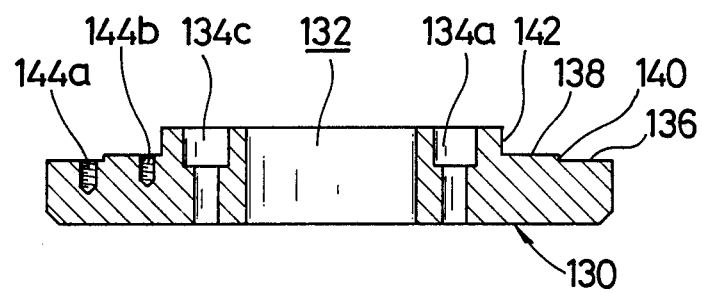
FIG. 25 is a cross-sectional view taken along line 25—25 of FIG. 24.

As shown in FIG. 24, a cutter body 130 has a central hole 132 through which the end of the rotatable shaft of a milling machine will be inserted. The cutter body 130, which is of a ring shape, also has a plurality (four in the illustrated embodiment) of holes 134a through 134d angularly spaced at equal intervals. As shown in FIG. 25, an annular recess 136 is defined in and around an outer peripheral surface of the cutter body 130, and an annular recess 138 is defined radially inwardly of the annular recess 136, the bottom of the recess 138 being higher than that of the recess 136. The recess 136 defines a radially outer annular step 140, and the recess 138 defines a radially inner annular step 142. A plurality of bolt holes 144a, 144b are defined in the annular recesses 136, 138. Cartridges 146, 152 are successively mounted on the cutter body 130.

Figure 26:
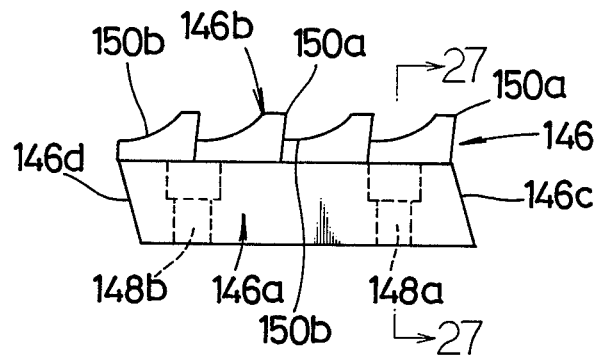
FIG. 26 is a front elevational view of the cartridge having rough cutting edges.
Figure 27:
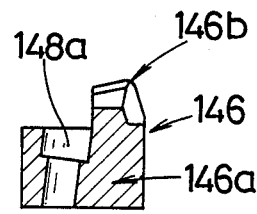
FIG. 27 is a cross-sectional view taken along line 27—27 of FIG. 26.
Figure 28:
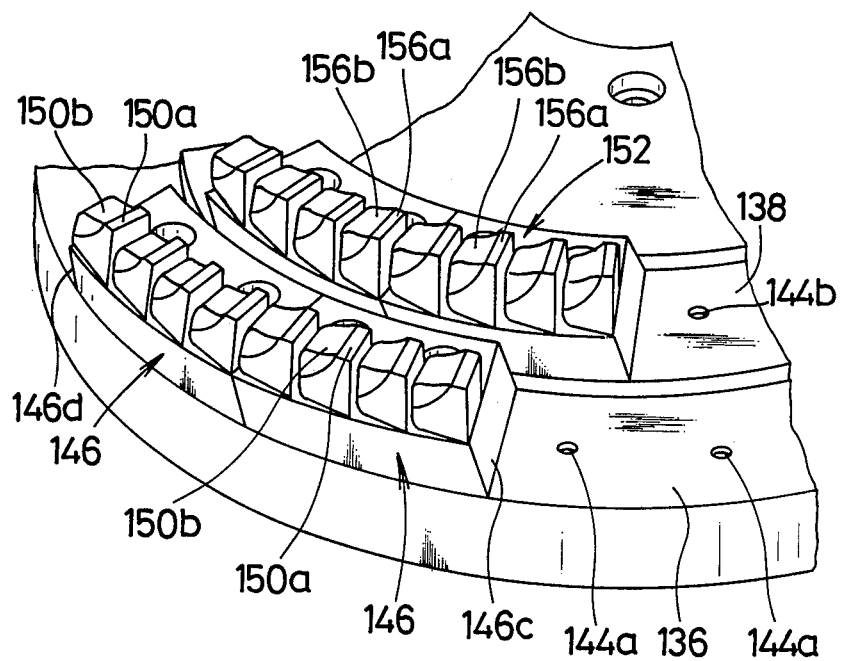
FIG. 28 is a fragmentary perspective view of the cutter body with cartridges mounted thereon.

The cartridge 146 is illustrated in FIGS. 26 and 27. The cartridge 146 is composed of a body 146a and a roughly cutting edge portion 146b having a plurality of cutting edges 150a. The cartridge 146 has holes 148a, 148b defined therethrough and inclined slightly with respect to the vertical direction as shown in FIG. 27. The cutting edge portion 146b also has arcuate or quadrantal flutes 150b extending from the cutting edges 150a, respectively. As illustrated in FIG. 26, the cartridge 146 has a slanted end surface 146c inclined outwardly in the longitudinal direction thereof and a slanted end surface 146d opposite and parallel to the slanted end surface 146c.

Figure 29:
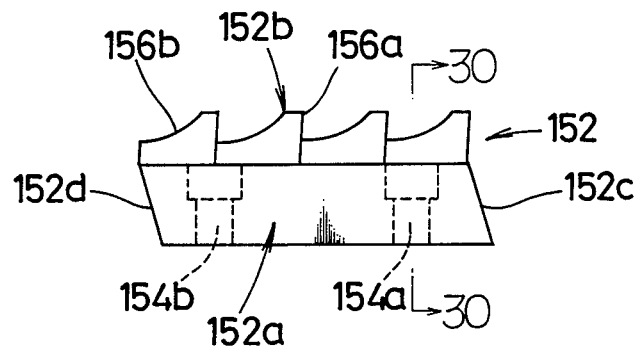
FIG. 29 is a front elevational view of the cartridge having finishing cutting edges.
Figure 30:
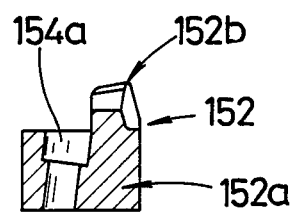
FIG. 30 is a cross-sectional view taken along line 30—30 of FIG. 29.

The cartridge 152 is shown in FIGS. 29 and 30. The cartridge 152 comprises a body 152a and a finishing cutting edge portion 152b having a plurality of cutting edges 156a. The cartridge 152 has inclined holes 154a, 154b defined therethrough as shown in FIG. 30. The cutting edge portion 152b also has arcuate or quadrantal flutes 156b extending from the cutting edges 156a, respectively. As illustrated in FIG. 29, the cartridge 152 has a slanted end surface 152c inclined outwardly in the longitudinal direction thereof and a slanted end surface 152d opposite and parallel to the slanted end surface 152c.

Figure 31:
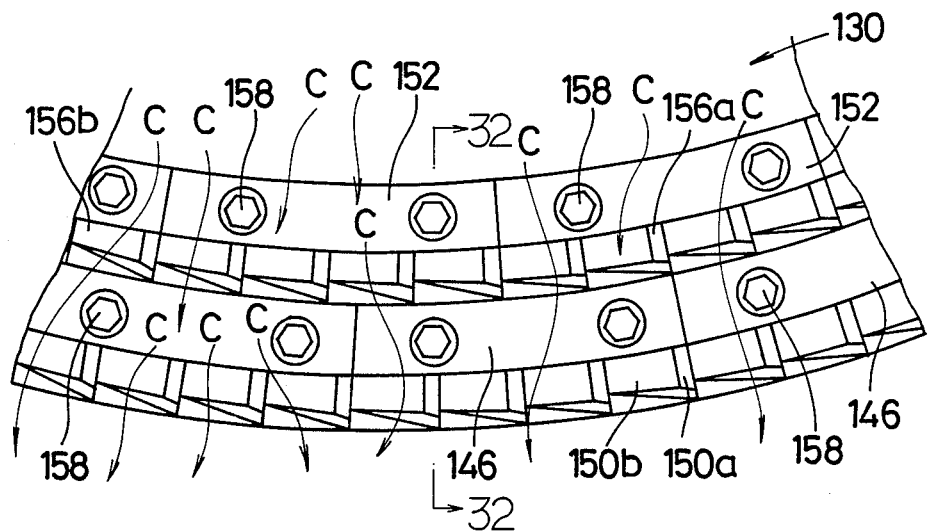
FIG. 31 is a fragmentary plan view of the cutter body and cartridges attached thereto.
Figure 32:
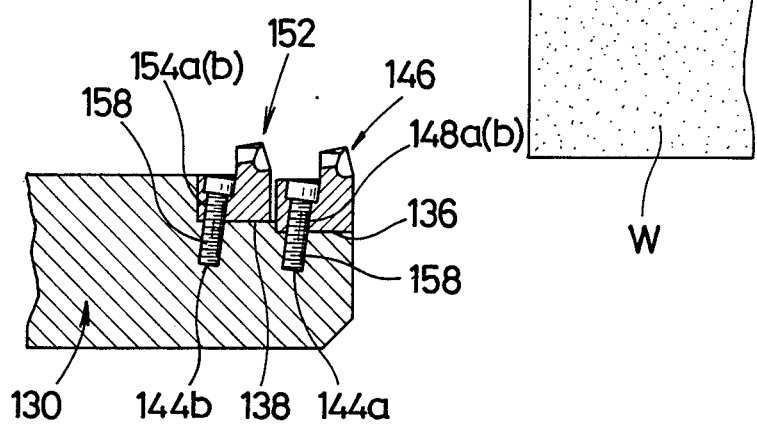
FIG. 32 is a cross-sectional view taken along line 32—32 of FIG. 31.
Figure 33:
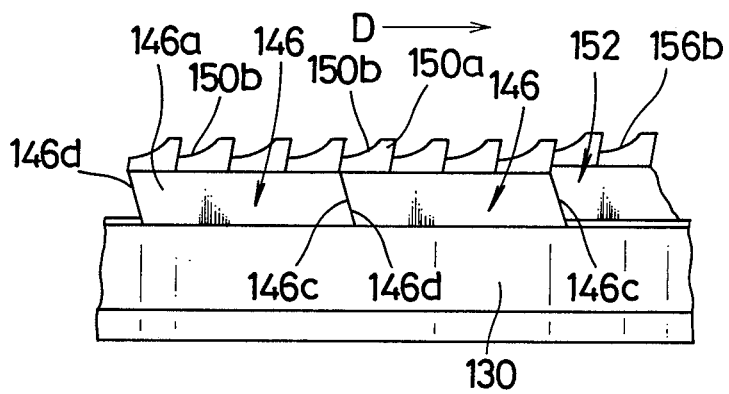
FIG. 33 is a fragmentary front elevational view of the cutter body with cartridges assembled thereon.

The cartridges 146, 152 are fixed to the cutter body 130 by means of bolts 158 as shown in FIGS. 31 through 33. More specifically, the bolts 158 are inserted through the holes 148a, 148b in the cartridges 146 and threaded into the holes 144a in the recess 136 of the cutter body 130, thus fastening the cartridges 146 to the cutter body 130. The bolts 158 are also inserted through the holes 154a, 154b in the cartridges 152 and threaded into the holes 144b in the recess 138 of the cutter body 130, thus fastening the cartridges 152 to the cutter body 130. Since the finishing cutting edge portions 152b are successively disposed in the recess 138 which is higher than the recess 136, the finishing cutting edge portion 152b will be positioned more closely to the workpiece W than the roughly cutting edge portion 146b.

Figure 34:
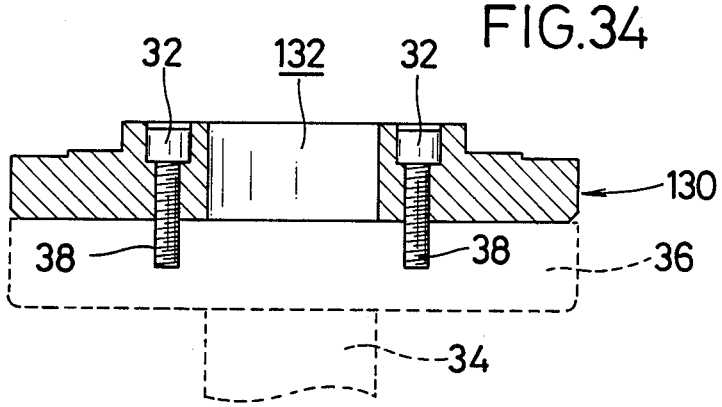
FIG. 34 is a vertical cross-sectional view of the cutter body fastened to a spindle.

The cutter body 130 thus constructed is coupled to the spindle 34 by the bolts 32 as shown in FIG. 34. Specifically, the bolts 32 are inserted through the holes 134a, 134d in the cutter body 130 and threaded into the bolt holes 38 in the flange 36 integral with the spindle 34, thereby joining the cutter body 130 to the spindle 34.

Operation and advantages of the milling cutter illustrated in FIGS. 24 through 34 will be described below.

When the non-illustrated rotative drive source is energized, the spindle 34 coupled thereto and the cutter body 130 are rotated. By feeding the workpiece W toward the cutter body 130 in the direction of the arrow B in FIG. 32, the cutting edges 150a on the cartridges 146 start roughly cutting the workpiece W. Chips formed by the cutting edges 150a from the workpiece W are discharged out through the flutes 150b. Upon continued movement of the workpiece W, the cutting edges 156a on the cartridges 152 finish the workpiece W. Relatively small chips produced by the cutting edges 156a are discharged out through the flutes 156b.

When cutting oil is supplied from the spindle 34 through the hole 132 to reduce any resistance to the cutting motion of the milling cutter, this cutting oil flows out of the cutter body 130 in the directions of the arrows C as shown in FIG. 31. Where the flutes 150b, 156b of the cartridges 146, 152 are radially aligned, chips can smoothly be delivered out through the flutes 150b, 156b.

Since many roughly cutting edges and finishing cutting edges can successively be mounted on the cutter body, the milling cutter is functionally analogous to a grinding wheel in milling operation, with the result that the milled surface of the workpiece can neatly and smoothly be finished. When any cutting edge portion 146b or 152b is worn, or should be changed to mill a different type of workpiece, it can be replaced in the following manner:

The bolts 158 are loosened to detach the cartridge 146 or 152 from the cutter body 130. A cartridge having a desired cutting edge portion is selected, and the bolts 158 are inserted through the holes therein and threaded into the bolt holes 144a, 144b in the cutter body 130 to fasten the cartridge to the cutter body 130.

The cartridge 146 or 152 can be positioned with respect to the cutter body 130 as follows: The cartridge 146 is held against the step 140 of the cutter body 130, and then kept in a position where its slanted surface 146d is pressed against the slanted surface 146c of the adjacent cartridge 146, followed by insertion of the bolts 158 threadedly into the holes 144a to secure the cartridge 146. The cartridge 152 can be positioned in the same manner as the cartridge 146. That is, the cartridge 152 is held against the step 142 of the cutter body 130, and then kept in a position where its slanted surface 152d is pressed against the slanted surface 152c of the adjacent cartridge 152, followed by insertion of the bolts 158 threadedly into the holes 144b to secure the cartridge 152. Where the holes 144a, 144b are positioned such that the flutes 150b, 156b of the cartridges are aligned radially of the cutter body 130, the cutting oil can flow smoothly for effective milling operation.

When the cutting edges 146b, 152b cut the workpiece W, they are subject to resistance to their cutting motion. Thus, the cutting edges 146b, 152b are subject at their tip ends to upward forces when the milling cutter is rotated in the direction of the arrow D (FIG. 33). However, the cartridges 146, 152 are pressed down against the cutter body 130 by the slanted surfaces 146d, 52d which are pressed by the slanted surfaces 146c, 152c of the adjacent cartridges 146, 152. Therefore, the cartridges 146, 152 remain securely clamped on the cutter body 130 against the resistance to the cutting motion, and hence are prevented from becoming unstable in attachment during milling operation.

With the above embodiment of FIGS. 24 through 34, the cartridges with many roughly cutting edges and finishing cutting edges are firmly fastened to the cutter body, and rotated for milling the workpiece. The workpiece can be roughly cut and finished at the same time by the single milling cutter. Since many cutting edges are mounted on the cutter body, the rate of milling operation is increased for a higher rate of production. When the cutting edges are worn or broken, or should be replaced with other cutting edges for milling a different workpiece type, they can simply be replaced by replacing the cartridges.

Although certain preferred embodiments have been shown and described, it should be understood that many changes and modifications may be made therein without departing from the scope of the appended claims.

What is claimed is:

1. A milling cutter comprising:

a cutter body having an outer peripheral edge and a plurality of circular steps defined concentrically along said outer peripheral edge, said steps including a radially inner step and a radially outer step, said radially inner step being higher than said radially outer step in the axial direction of said cutter body;

a first plurality of cartridges disposed successively on said radially inner step by fastening means without substantial gaps therebetween, each of said first cartridges having a body portion and a cutting edge portion with at least two finishing cutting edges with first flutes, said first cutting edges of said cartridges being spaced at equal intervals fully around said cutter body, said cartridge body including leading and trailing surfaces slanted complementarily in the direction of rotation of said cutter body, said cartridges being arranged on said first step with said leading surfaces being pressed by said trailing end surfaces of adjacent said cartridges, said first flutes being in communication with each other for discharging cutting oil therethrough; and a second plurality of cartridges disposed successively on said radially outer step by fastening means without substantial gaps therebetween, each of said second cartridges having a body portion and a cutting edge portion with at least two roughly cutting edges with second flutes, said second cutting edges of said cartridges being spaced at equal intervals fully around said cutter body, said cartridge body including leading and trailing surfaces slanted complementarily in the direction of rotation of said cutter body, said cartridges being arranged on said second step with said leading surfaces being pressed by said trailing end surfaces of adjacent said cartridges, said second flutes being in communication with each other for discharging cutting oil therethrough.

2. A milling cutter according to claim 1, wherein said cartridges are detachably mounted on said cutter body.

3. A milling cutter according to claim 2, wherein said cartridges have holes extending in the axial direction of said cutter body, said cutter body having holes aligned with said holes of the cartridges, said cartridges being fastened to said cutter body by bolts extending through said holes of the cartridges threaded into said holes of the cutter body.

4. A milling cutter according to claim 1, wherein said cartridges have holes extending in the axial direction of said cutter body, said cutter body having holes aligned with said holes of the cartridges, said cartridges being fastened to said cutter body by bolts extending through said holes of the cartridges threaded into said holes of the cutter body.

5. A milling cutter according to claim 1, wherein said cutter body includes an annular projection extending along and close to said outer peripheral edge thereof, said steps being defined on said annular projection.

6. A milling cutter according to claim 1, wherein said step has a plurality of equally spaced ridges, said cartridges having slots in which said ridges are fitted.

7. A milling cutter according to claim 1, wherein said cartridge body and said cutting edge portion are made of the same material and integral with each other.

8. A milling cutter according to claim 1, wherein said cartridge body and said cutting edge portion are separate from each other, said cutting edge portion being brazed to said cartridge body.

9. A milling cutter according to claim 1, wherein said roughly cutting edges and said finishing cutting edges are detachably mounted on said cartridge body.

10. A milling cutter according to claim 1, wherein said roughly cutting edges are detachably mounted on said cartridge body, and said finishing cutting edges are brazed to said cartridge body.

11. A milling cutter according to claim 1, wherein each of said cutting edges of the roughly cutting edge portions includes diamond or cubic boron nitride.

12. A milling cutter according to claim 1, wherein each of said cutting edges of the finishing cutting edge portions includes abrasive grain partly exposed on a plated layer.

13. A milling cutter according to claim 12, wherein each of said cutting edges of the finishing cutting edge portions is made of an electrically conductive material.

14. A milling cutter according to claim 13, wherein said electrically conductive material is steel.

* * * * *